Oct. 31, 1939.  F. BRACKEN ET AL  2,177,687
ELECTRIC GENERATOR UNIT
Original Filed Nov. 19, 1937   2 Sheets-Sheet 2
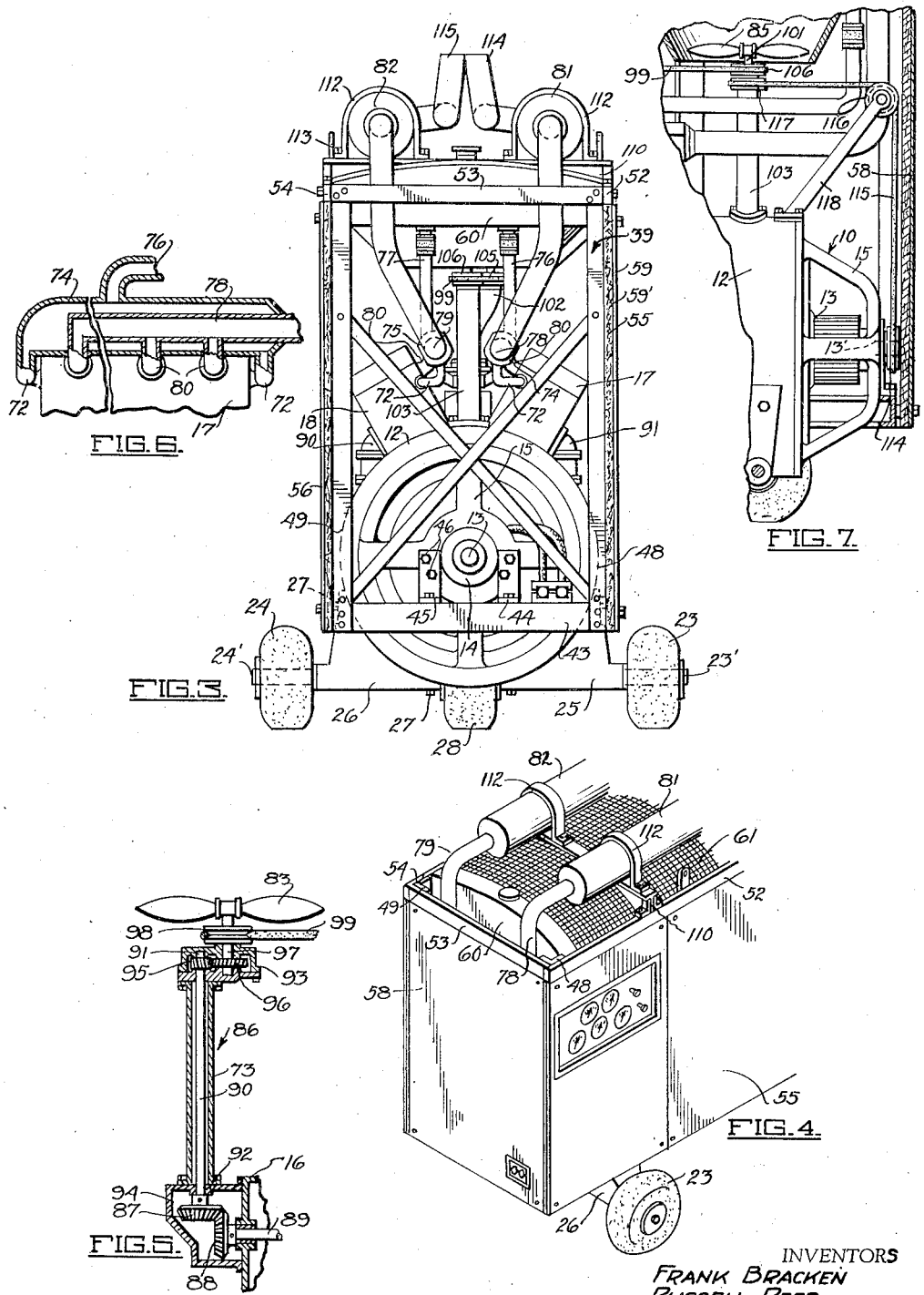
INVENTORS
FRANK BRACKEN
RUSSELL REED
BY
W. W. Beatty
ATTORNEY.

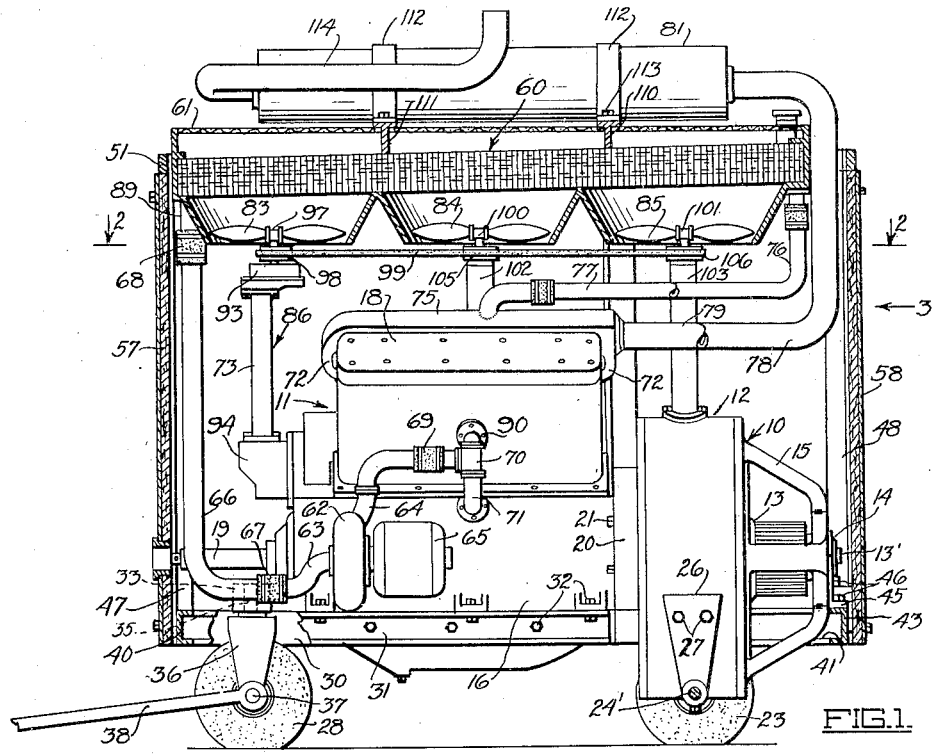

Patented Oct. 31, 1939

2,177,687

UNITED STATES PATENT OFFICE 2,177,687

ELECTRIC GENERATOR UNIT

Frank Bracken and Russell Reed, Los Angeles, Calif., assignors to Warner Bros. Pictures, Inc., New York, N. Y., a corporation of Delaware Original application November 19, 1937, Serial No. 175,442. Divided and this application September 10, 1938, Serial No. 229,346

9 Claims. (Cl. 290—1)

This invention relates to electric generator units and has the following objects: To reduce the noise of an internal combustion engine and generator driven thereby; to direct the noise of an engine driven generator assembly in a predetermined path, to increase the efficiency of a cooling system for an engine and generator driven thereby, to utilize a cooling system of an internal combustion engine to cool an electric generator driven by the engine; to increase the flow of air in the cooling system for an engine driven generator unit, and to produce a compact engine driven generator assembly.

The manner in which the above and other objects of the invention is accomplished will be apparent from the following specification read in conjunction with the accompanying drawings wherein:

Fig. 1 is a sectional, elevational view through an engine driven generator assembly embodying the present invention.

Fig. 2 is a sectional plan view of the generator assembly and is taken along the lines 2—2 of Fig. 1.

Fig. 3 is an end view of the generator assembly with the rear panel removed and is taken in the direction of the arrow 3 of Fig. 1.

Fig. 4 is a perspective view of the rear of the generator assembly.

Fig. 5 is a sectional, elevational view of the fan drive and is taken along the line 5—5 of Fig. 2.

Fig. 6 is a sectional view, partly broken away, of one of the water jacketed exhaust manifolds.

Fig. 7 is a sectional view, partly broken away, through the generator assembly showing a modified form of fan drive.

Referring particularly to Figs. 1, 2 and 3, the engine-generator assembly comprises an electric generator generally indicated at 10 and a gasoline engine of the V-type generally indicated at 11.

The generator 10 is of the usual construction comprising a circular casing 12 enclosing both the field coils (not shown) and the armature 13. The armature shaft 13' of armature 13 is rotatably carried at one end thereof in an outboard bearing 14 supported from the casing 12 through a spider shaped bracket 15.

The gasoline engine 11 is also of the usual construction comprising a crankcase 16 and a pair of cylinder blocks 17 and 18 secured thereto in a V-formation. The crank shaft 19 of the engine 11 is suitably connected in a manner not shown to the armature 13 for rotating the same. A flange 20 at the rear of the engine 11 is secured to the generator 10 through bolts 21, forming an integral engine-generator unit.

The rear of the engine-generator unit is supported by means of wheels 23 and 24. Respective shafts 23' and 24' of wheels 23 and 24 are carried by brackets 25 and 26, respectively, secured on either side of the generator casing 12 by bolts 27.

A sub chassis is provided to support the forward end of the engine-generator unit on a single steerable wheel 28. This chassis comprises a pair of longitudinally extending channel members 30 and 31 on either side of the crankcase 16 of engine 11. Each of the channel members 30 and 31 are secured to the sides of the crankcase 16 by a series of bolts 32. A cross bar 33 is secured across the members 30 and 31 by bolts 34 and has formed in the center thereof a vertically extending bearing to rotatably receive an upwardly extending bearing stud 35 projecting from a wheel saddle 36. Saddle 36 has secured to the lower ends thereof the shaft 37 of wheel 28. A draw bar 38 is secured to the shaft 37 for the purpose of moving and steering the unit.

The forward ends of the channel members 30 and 31, forming part of the sub-chassis, are secured, as by welding, to a cross piece 40 forming part of a panel frame generally indicated at 39. Longitudinally extending frame beams 41 and 42, also forming part of the panel frame 39 are secured at either end of the cross piece 40. The opposite ends of the members 41 and 42 are welded to a second cross piece 43. The rear section of the panel frame 39 is supported from the generator 12 through brackets 44 and 45, (Fig. 3) which brackets secure the cross bar 43 to the spider bracket 15 of the generator 12 by bolts 46. Vertical corner posts comprising structural angles 47, 48, 49 and 50, also forming part of the panel frame 39 are suitably secured at their lower ends to the corners of the rectangular frame comprising the members 40, 41, 42 and 43. Structural ties 51, 52, 53 and 54 completing the panel frame 39 are secured between the upper ends of the corner posts 47 to 50, inclusive.

A series of sound insulating panels 55, 56, 57 and 58, enclosing the sides of the panel frame 39, form an enclosure open at its bottom and top ends to form an air and sound conduit therethrough. Each of these panels comprises an outer sheet of metal 59 and an inner sheet of sound absorbing and fireproof material 59', such as asbestos, secured thereto to reduce the transmission of sound therethrough.

An air cooled heat radiating water "radiator" 60 is suitably secured in the upper end of the panel frame and substantially fills the same. The radiator 60 slopes downward slightly, for example, at the front end thereof to permit a drainage of the water therein toward the front of the unit. A protective wire screen of wide mesh 61 is supported above the surface of the radiator 60 to prevent damage to the radiator from falling objects. The position of the radiator 60 in a horizontal position not only permits it to be cooled in part by the natural convection of the air but results in a more unitary and compact structure for the same amount of radiator surface. Furthermore, the radiator is situated in a safe and unobstructing position permitting ready access to all parts of the generator and motor.

The water cooling system for the engine 11 comprises a water pump 62 having an inlet 63 and an outlet 64, which pump is driven by a suitable motor 65. Pump 62 may also be coupled to the cam shaft of engine 11. The inlet 63 is connected to the outlet end of the radiator 60 through an inlet pipe 66. Flexible hose couplings 67 and 68 are provided to resiliently support the pipe 66 between the inlet 63 of pump 62 and the outlet 89 of the radiator 60 to prevent breakage thereof due to vibration or misalignment of the radiator 60 relative to the engine 11. The outlet 64 of the water pump 62 is connected through a flexible hose coupling 69 to a T 70. One end of the T 70 is connected to the water cooling passages (not shown) of the cylinder block 18 through a connection 90. The other end of the T 70 is connected through a conduit 71, passing through the crankcase 16, to a connection 91 (Fig. 3) communicating with the water cooling passages in the opposed cylinder block 17. After passing through the water cooling passages of the cylinder blocks 17 and 18, the water is passed through short conduits 72 opening into water jackets 74 and 75, respectively. Return conduits 76 and 77 are connected between the water jackets 74 and 75, respectively, and the rear end of the radiator 60 to return the heated water to the radiator for cooling.

The water jackets 74 and 75 enclose a portion of the exhaust manifolds 78 and 79, respectively, which are connected through conduits 80 (Fig. 6) to the interiors of the exhaust chambers of the respective cylinder blocks. The manifolds 78 and 79 pass above the radiator 60 and open into separate sound absorbing "mufflers" 81 and 82, respectively.

The radiator 60 is cooled by a series of fans 83, 84 and 85. The fan 83 is driven from the cam shaft of the engine 11 through a gear unit generally indicated at 86 (Fig. 5). Unit 86 comprises a pair of beveled gears 87 and 88, the gear 88 being secured to the end of the cam shaft 89 of motor 11. The gear 87 is secured to the lower end of a shaft 90 journaled within bearings 91 and 92 formed in upper and lower gear casings 93 and 94, respectively. The upper gear casing 93 is supported from the lower casing 94 by a tubular column 73. The pinion gear 95, secured to the upper end of the shaft 90, meshes with a gear 96, secured to the fan shaft 97. The shaft 97 is journaled within bearings formed in the upper gear casing 93 and has secured thereto a belt pulley 98 adapted to drive a continuous belt 99. The fans 84 and 85 are secured to vertically extending shafts 100 and 101, respectively, journaled within columns 102 and 103, respectively. The column 103 is secured to the upper surface of the casing 12 of generator 10, while the column 102 is secured to a cross plate 104 (Fig. 2) suitably supported between the two cylinder blocks 17 and 18. Pulleys 105 and 106 are secured to the fan shafts 100 and 101, respectively.

A modified form of fan drive is shown in Fig. 7 wherein the fans 85 etc. are driven from the generator shaft 13' instead of from the cam shaft 89 of engine 11. In this case the casings 93, 94 and column 73 (Figs. 1 and 5) are retained merely to provide bearings for the fan shaft 97, the shaft 90 and gears associated therewith being removed. A pulley 114 (Fig. 7) is secured to the end of generator shaft 13' to drive an endless belt 115. Belt 115 travels over a pair of co-axial idler pulleys, one of which is shown at 116, and around a pulley 117, secured to the fan shaft 101 of fan 85. A bracket 118 rotatably supports the co-axial pulleys from the top of generator casing 12.

In lieu of the above mentioned arrangements for driving the fans 83, 84 and 85, an electric motor may be substituted, deriving its current from the output circuit of the generator 10.

It will be noted on reference to Fig. 2 that the shaft 100 of fan 84 is disposed out of line with the centers of the other fans 83 and 85 whereby a sufficient amount of arcuate contact of the belt 99 on the pulley 105 is formed to insure a driving traction.

Mufflers 81 and 82 are supported above the radiator 60 on cross beams 110 and 111. These beams are supported at their ends on the longitudinally extending upper frame members 52 and 54, forming part of the panel frame 39. Semi-circular straps 112 secure each of the mufflers 81 and 82 to the cross beams 110 and 111 by bolts 113.

The transmission of sound from a medium of a certain density to another medium of a different density will cause reflection and refraction of the sound to be set up at the juncture of the two mediums. Furthermore, the amount of reflection depends on the difference in density between the mediums through which the sound is passed, it being greater for greater differences in density. The mufflers 81 and 82 are arranged to utilize the above principle by spacing them apart, closely adjacent the edges of the side panels 55 and 56. Also the mufflers are arranged parallel with each other. Now, when the bank of heated air, carrying with it the engine noises, is forced upwardly through the radiator 60 by the fans 83, 84 and 85, it passes in contact with the mufflers 81 and 82. Therefore, this bank of heated air will be further heated along the sides thereof due to its contact with the hot mufflers which are in turn heated by the exhaust gases passing therethrough from the engine 11. Thus it will be seen that the density of the heated air bank which is reduced due to the heat thereof will be further reduced along the sides thereof because of additional heating imparted by the mufflers 81 and 82. Consequently, a greater change in density will be effected at the boundary of the heated air bank and the outer cool air resulting in a greater reflection and refraction of the sound waves within the air bank. This reflection and refraction of the sound waves will continue back and forth across and within the air bank as it is rising upwardly from the generator unit thereby substantially confining the noise within the heated air bank and reducing the horizontal transmission of said sound outside of the heated air bank.

Whether the above explanation is correct or not, the fact is that we have successfully demonstrated that the method and means herein disclosed provide a much quieter generator unit then heretofore.

However, there is support for our view that a material part of the reduction of the various noises of the engine and generator is caused by the absorption of sound by the heated air through which the various noises pass.

As will be noted in Figs. 1 and 3 the outlet conduits 114 and 115 of the mufflers 81 and 82, respectively, are returned to a central position relative to the radiator 60 and terminate in an upwardly extending position to direct the exhaust gases upwardly in the rising air currents. The exhaust of the exhaust gases in an upward direction as well as the heat produced by the mufflers 81 and 82 increases the natural convection of air through the enclosure formed by the various panels 55 to 58, inclusive, thereby reducing the transmission of exhaust and engine noise in a horizontal direction.

Due to the position of the mufflers within the vertically rising current of air caused by the fans 83, 84 and 85, as well as due to the natural convection thereof, these mufflers will be cooled, thus reducing the expansion of exhaust gases therein and consequently reducing the noise caused by these gases.

The cooling of the exhaust manifolds by means of the water jackets 74 and 75 insures a minimum of heat being generated within the enclosure formed by the panels 55 to 58, inclusive, while reducing the expansion of the gases within these manifolds with a consequent reduction in sound in the exhaust.

The particular arrangement of the radiator 60 above the motor 11 and generator 12 and the provision for directing the air upwardly in a vertical direction permits both the engine and particularly the generator to be cooled by the air passing upwardly through the enclosure before it is warmed by passage through the radiator. This particular arrangement also insures that all parts of the engine-generator unit as well as the radiator 60 are equally exposed to the draft of cooling air. Furthermore, the use of a plurality of fans insures a uniform cooling of the entire surface of the radiator 60 while permitting a relatively slow peripheral speed of each fan to obviate the noisy whirl caused by the fan blades at high speed.

The invention is particularly applicable to portable engine driven generator units for use in supplying current to lamps, motors, etc. used in photographing motion pictures while recording the sound incident thereto. However, it is to be understood that the invention has numerous other fields of application. Further, while we have illustrated and described our invention in its preferred embodiment, it is to be understood that various modifications may be made and no limitations upon the invention are intended other than are imposed by the scope of the appended claims.

This application is a division of application S. N. 175,442 filed November 19th, 1937, for Engine driven generator system and method of operating same.

We claim:

1. A motor generator set comprising a motor, a generator driven by said motor, a vertically extending enclosure surrounding said motor and said generator, said enclosure being open at the top and the bottom thereof and being adapted to transmit air throughout substantially the entire cross sectional area thereof around said engine and said generator, a cooling system for said engine, a radiator for said cooling system, said radiator extending across the top of said enclosure, and means for passing air upwardly through said enclosure.

2. A motor generator set according to claim 1 comprising a muffler for said motor extending above said radiator in the path of air passing through said enclosure.

3. A motor generator set comprising a motor, a generator driven by said motor, a cooling system for said motor, a horizontally disposed radiator for said motor extending above said motor and said generator, and a plurality of fans intermediate said radiator and said motor generator for passing air upwardly around said motor and said generator and through said radiator, one of said fans being adapted to pass air around said generator and through said radiator and another of said fans being adapted to pass air around said motor and through said radiator.

4. A motor generator set comprising a motor, a generator driven by said motor, a cooling system for said motor, a radiator for said cooling system, means for passing air around said generator and through said radiator, and means other than said last mentioned means for passing air around said motor and through said radiator.

5. A motor generator set comprising a motor, a generator driven by said motor and having an axis thereof aligned with the axis of said motor, a plurality of fans aligned in a row parallel to the axes of said motor and said generator, said fans being arranged to pass air transversely around said motor and said generator and means for driving said fans.

6. A motor generator set according to claim 5 comprising a cooling system for said motor, a radiator for said cooling system and means supporting said radiator in the path of said air on the side of said fans opposite said motor and said generator.

7. A motor generator set comprising an internal combustion motor, an electric generator coupled thereto, an enclosure surrounding said motor and said generator and having an air inlet at the bottom thereof and an air outlet at the top thereof, a fan above said motor, a fan above said generator, means for driving said fans, and a radiator for said motor in said outlet common to said fans.

8. A motor generator set comprising an engine, a generator driven by said engine, a vertically extending enclosure surrounding said engine and said generator, said enclosure being open at the top and bottom thereof, a cooling system for said engine, a radiator for said cooling system, said radiator extending across the top of said enclosure and means for passing air upwardly through said enclosure in substantially mutually exclusive columns, one of said columns passing around said generator and another of said columns passing around said engine.

9. A motor generator set comprising an internal combustion engine, a generator coupled thereto, an enclosure surrounding said motor and said generator and having an air inlet at the bottom thereof and an air outlet at the top thereof, a muffler, means for conveying exhaust gases from said engine to said muffler, and means for supporting said muffler above said engine and said generator in the path of air passing through said enclosure whereby to cause convection of air through said enclosure.

FRANK BRACKEN.
RUSSELL REED.